July 18, 1967
H. G. CONDIT
3,331,408
PORTABLE POWER SAW WITH SAFETY SWITCH MEANS TO PRECLUDE
OPERATION EXCEPT WHEN THE SAW IS IN ENGAGEMENT
WITH THE WORKPIECE
Filed Sept. 8, 1965
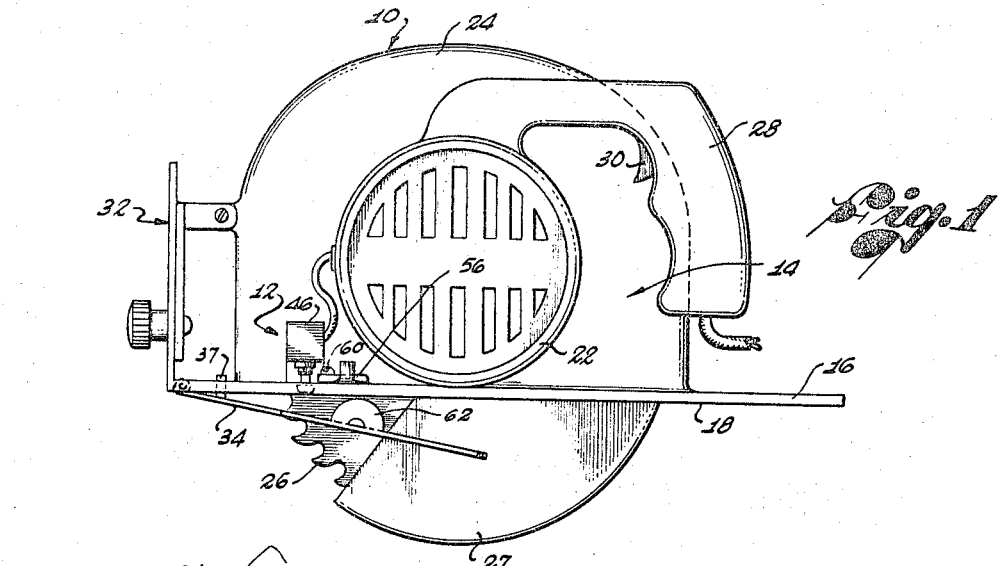
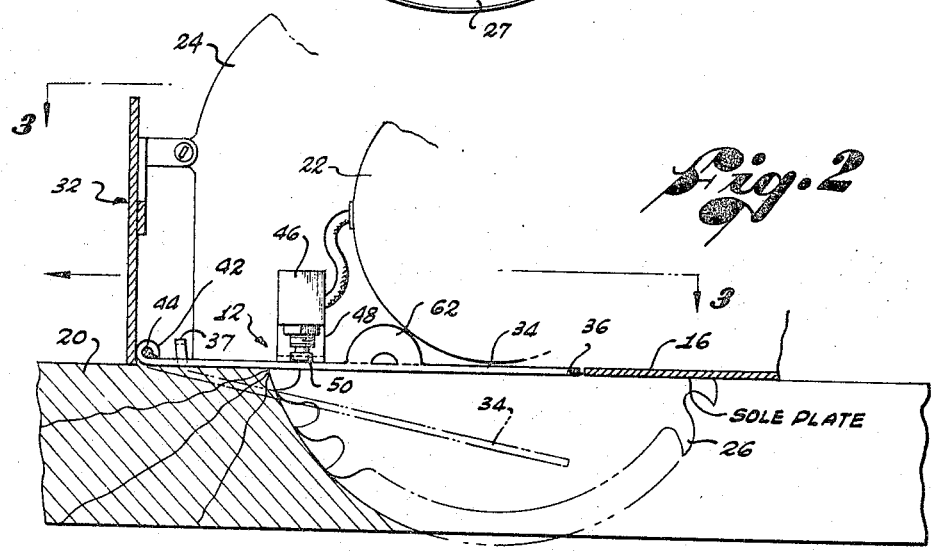
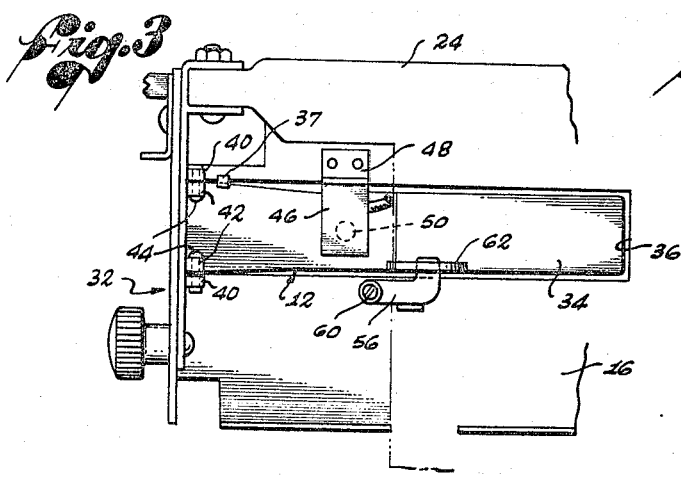
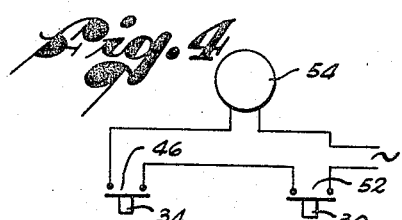
INVENTOR.
HARRY G. CONDIT
BY Forrest J. Lilly
ATTORNEY

United States Patent Office 3,331,408
Patented July 18, 1967

3,331,408
PORTABLE POWER SAW WITH SAFETY SWITCH MEANS TO PRECLUDE OPERATION EXCEPT WHEN THE SAW IS IN ENGAGEMENT WITH THE WORKPIECE
Harry G. Condit, 22656 Friar St.,
Woodland Hills, Calif. 91364
Filed Sept. 8, 1965, Ser. No. 485,729
4 Claims. (Cl. 143—43)

This invention relates generally to power tools and has more particular reference to a novel safety switch for power tools.

Most, if not all, power tools present a serious safety hazard, even in the hands of the most skillful operator. This is particularly true of rotary cutting tools, such as power saws, and especially power hand saws. The present invention seeks to alleviate the safety hazard associated with such tools by the provision of a safety switch which is arranged to be actuated by the workpiece when the latter and tool are brought into operative relation. In this way, accidental operation of the tool prior to engagement of the workpiece with the tool is prevented and the dangers attendant to such accidental operation are minimized or eliminated. According to the preferred practice of the invention, the safety switch is connected in circuit with the manual switch which is normally provided to control the tool motor in such a way that energizing of the motor requires simultaneous actuation of both switches.

As indicated above, and as will become evident from the ensuing description, the safety switch of the invention may be embodied in a wide variety of power tools. The present safety switch, however, is particularly useful on power hand saws. For this reason, the invention will be disclosed herein in connection with its application to power hand saws.

One of the dangers attendant to the use of a power hand saw results from the fact that such a saw is commonly carried from one location to another while the saw motor is plugged into an electrical power supply. If the operator carrying the saw should accidentally trip or fall, his natural reflexes tend to cause his arms to be thrown forwardly and his hand to tightly grip the saw handle, thereby depressing the switch trigger which controls the saw motor. As a consequence of these reflex actions, the rotating saw blade may be brought into contact with the operator's body, thus causing serious injury. As a matter of fact, this very type of accident has occurred many times in the past and continues to be a frequent source of injury to both the amateur and the professional carpenter. Another danger attendant to the use of hand saws resides in the fact that the switch actuator for controlling the saw motor may be accidentally depressed in the course of maneuvering the saw into position on the workpiece and prior to proper engagement of the saw with the workpiece, with the result that the operator may incur injury.

The foregoing discussion has related to safety hazards which arise from accidental starting of the motor of a power hand saw. Injury to the operator or other persons in the vicinity and/or damage to the saw blade or nearby articles may be incurred in the event that the saw motor is not stopped immediately upon completion of the saw cut and before the saw is set aside. In this regard, for example, it is well known to all users of hand saws that the blade of a hand saw continues to turn at a dangerous speed for some time after the saw motor is de-energized. If the saw is set aside before the blade slows sufficiently, the rotating blade may contact and damage other articles in the vicinity, or the blade itself may be damaged by contact with such other articles, or injury may result to the operator or other nearby persons as a result of accidental contact with the rotating blade. These latter dangers attendant to the use of power hand saws may be alleviated by prompt de-energizing of the saw motor at the conclusion of each saw cut so as to minimize or eliminate the possibility of the saw being set aside before the saw blade comes to rest.

The present invention provides a safety switch for power tools which may be applied to power hand saws for the purpose of alleviating the foregoing and other dangers inherent in the use of such saws. As noted earlier, however, and as will become evident from the following description, the safety switch of the invention may be applied to other power tools to minimize similar safety hazards involved in the use of all power tools.

Accordingly, it is a general object of the invention to provide a novel safety switch for power tools.

Another object of the invention is to provide a safety switch for power tools which is uniquely constructed and arranged for actuation by the workpiece on which the tool operates, whereby inadvertent energizing of the tool motor prior to operative engagement of the tool with the workpiece is prevented.

Another object of the invention is to provide a safety switch for power tools which is connected in circuit with the normal manual switch for the tool motor in such a way as to require simultaneous actuation of both switches for energizing of the tool motor.

Yet another object of the invention is to provide a safety switch for power tools which effects de-energizing of a tool motor immediately upon disengagement of the tool and workpiece, whereby the dangers attendant to continued operation of the tool after disengagement of the tool and workpiece are minimized or eliminated.

A further object of the invention is to provide a power hand saw embodying the present safety switch, which saw is relatively free of the safety hazards normally encountered in the use of power hand saws, such as those safety hazards which result from inadvertent energizing of the saw motor when carrying the saw or maneuvering the latter into position on a workpiece, continued energizing of the saw motor after removal of the saw from the workpiece, and setting aside of the saw while the saw blade is turning at a dangerous speed.

A still further object of the invention is to provide a safety switch for power tools which may be selectively inactivated to permit normal operation of a tool, and which is relatively simple in construction, easy to install, economical to manufacture, reliable in operation, and otherwise ideally suited to its intended purposes.

Other objects, advantages, and features of the invention will become readily evident as the description proceeds.

With these and other objects in view, the invention consists in the construction, arrangement and combination of the various parts of the invention, whereby the objects contemplated are attained, as hereinafter set forth, pointed out in the appended claims, and illustrated in the accompanying drawing.

In this drawing:

FIG. 1 is a side elevation of a power hand saw embodying a safety switch according to the invention;

FIG. 2 is a slightly enlarged, fragmentary side elevation of the hand saw in FIG. 1 during operation thereof;

FIG. 3 is a view looking in the direction of the arrows on line 3—3 in FIG. 2; and FIG. 4 is a schematic diagram illustrating the electrical circuit of the saw.

The power tool or power hand saw 10 illustrated in this drawing is conventional except for the present safety switch 12 embodied therein. Accordingly, the hand saw proper will be described only in sufficient detail to enable a full and complete understanding of the invention.

Hand saw 10 comprises an upper frame 14 and a lower support member 16 with a work-engaging surface 18. When the tool is in operation, the work-engaging surface 18 is disposed in supporting contact with the workpiece 20 on which the tool operates. In the case of a portable power tool, such as the illustrated power hand saw, the support member 16 serves to support the tool on the workpiece. The present safety switch may also be embodied in larger, stationary power tools in which the support member may comprise a worktable, or the like, for supporting the workpiece on the tool. The support member 16 is commonly termed, and is hereinafter referred to, as a sole plate.

The saw frame 14 comprises a motor housing 22 and a generally semi-circular blade enclosure 24 rigid on one end of the housing. Coaxially disposed within the blade enclosure 24 is a circular saw blade 26. Blade 26 is fixed to the shaft of a motor (not shown) enclosed within the motor housing 22. The blade projects through a slot in the sole plate 16 and below the work-engaging surface 18 of the plate. The lower projecting portion of the saw blade 26 is normally covered by a saw guard 27 which is rotatably mounted on the frame 14 in such a way that the guard is retracted by the workpiece 20 when the saw is advanced into cutting engagement with the workpiece. Attached to and extending rearwardly from the motor housing 22 is a hand grip 28 by which the saw is held. A switch actuating member or trigger 30 is pivotally mounted on this hand grip for depression by the forefinger of the hand which grasps the tool. In a conventional hand saw, depression of the trigger 30 energizes the saw motor to drive the blade 26 in rotation.

Sole plate 16 is attached to the saw frame 14 by a compound hinge connection 32. This hinge connection permits pivotal adjustment of the sole plate about an axis parallel to the rotation axis of the saw blade 26 to adjust the projection of the blade beyond the work-engaging surface 18 and, thereby, the depth of cut. Hinge connection 32 also permits pivotal adjustment of the sole plate 16 about a second axis normal to the blade axis and parallel to the sole plate to vary the angle between the plane of the plate and the plane of the saw blade for the purpose of cutting bevels.

The power hand saw 10, as it is thus far described, is conventional with the exception of the safety switch 12 embodied therein. Safety switch 12 comprises a blade-like switch actuator 34 which extends generally lengthwise of the sole plate 16 and parallel to the plane of the saw blade 26, and has one end located between the leading edge of the work engaging surface 18 and the blade and its other end located somewhat to the rear of a plane normal to the surface and containing the rotation axis of the blade. This actuator is laterally offset from the plane of the blade and is disposed within a complementary opening 36 in the sole plate 16. The leading, left-hand end of the actuator 34 is attached to the sole plate 16 in such a way as to permit pivotal movement of the actuator between its solid line position of FIG. 1, wherein the actuator extends at an acute angle to the plane of the sole plate and the trailing right-hand end of the actuator projects beyond the work-engaging surface 18 of the plate, and its solid line position of FIG. 2, wherein the actuator is disposed within the sole plate opening 36, substantially flush with the work-engaging surface. Pivotal movement of the actuator 34 in the direction of its extended, solid line position of FIG. 1 is limited by coacting stop means 37 on the actuator and sole plate 16. In the ensuing description, the position of the actuator illustrated in FIG. 1 is referred to as its normal or off position and the solid line position of the actuator illustrated in FIG. 2 is referred to as its retracted or on position. Pivotal movement of the actuator may be accomplished in various ways. For example, the actuator may comprise a spring blade. In this event, the leading end of the actuator may be rigidly attached to the sole plate 16 in such a way as to permit bending or flexing of the actuator between its normal and retracted positions. The actuator illustrated in the drawing, however, comprises a relatively rigid blade, the leading end of which is pivotally attached, by a pivotal connection 38, to the leading end of the sole plate. The illustrated pivotal connection 38 for the actuator comprises abutting, upstanding ears 40 and 42 on the sole plate and actuator, respectively, and rivets 44 extending through the abutting ears.

Mounted on the sole plate 16 over the actuator 34 is an electrical switch unit 46, such as a microswitch. Switch unit 46 may be mounted on the sole plate in various ways. In the illustrated power saw, for example, the switch unit is attached to an upstanding bracket 48 which may be spot welded or otherwise rigidly secured to the sole plate. The button 50 of switch unit 46 is disposed for engagement by the switch actuator 34 upon upward pivotal movement of the actuator from its normal off position to its retracted on position.

Switch unit 46 is connected in electrical circuit with the saw motor and the normal trigger switch of the saw in such a way that simultaneous actuation of both switches is required to energize the motor. Thus, referring to FIG. 4, it will be observed that the switch unit 46 and the switch 52 which is operated by the trigger 30 of the power saw 10 are normally open switches connected in electrical series with the saw motor 54, whereby both switches must be closed simultaneously to energize the motor. Switch unit 46 is closed in response to pivotal movement of the switch actuator 34 to its solid line retracted or on position of FIG. 2. Trigger switch 52 is closed in response to depression of the trigger 30 to its on position.

In operation of the hand saw 10, the latter is engaged with the workpiece 20 in the usual way. During this engagement of the saw with the workpiece, the latter depresses the actuator 34 of the safety switch 12 to its solid line retracted or on position of FIG. 2, thereby conditioning the saw motor 54 to be energized. According to the preferred operating method, the trigger 30 on the saw is depressed to its on position prior to engagement of the saw with the workpiece so that the saw motor is immediately energized in response to depression of the safety switch actuator by the workpiece. In this regard, it is significant to note that the leading end of the actuator is located some distance in advance of the saw blade 26 so that the saw motor is energized prior to engagement of the saw blade with the workpiece. Thereafter, the workpiece is cut by advancing the hand saw along the workpiece, in the usual way. The saw motor 54 continues to be energized as long as the switch trigger 30 remains depressed and the safety switch actuator 34 is retained in its retracted position by the workpiece. The saw motor is de-energized in response to release of the switch trigger 30 or return of the safety switch actuator 34 to its normal position. In this regard, it is significant to note that the saw motor is de-energized automatically and immediately in response to movement of the safety switch actuator beyond the edge of the workpiece. It is also significant to note that since the trailing end of the safety switch actuator is disposed rearwardly of the rotation axis of the saw blade 26, the actuator remains in operative engagement with the workpiece until shortly after the completion of the saw cut regardless of the depth of cut. The safety switch 12 is obviously effective to control energizing of the saw motor 54 at any angular position of the sole plate 16 about either of its pivot axes. In this regard, attention is directed to the fact that the present safety switch, including its actuator 34 and switch unit 46, is located in such a position as to not interfere with pivotal adjustment of the sole plate.

It is now evident that depression of the switch trigger 30 on the power hand saw 10 is ineffective, by itself, to energize the saw motor 54. Moreover, the saw motor is de-energized immediately upon advancing of the saw blade 26 beyond the edge of the workpiece. Accordingly, the present safety switch 12 is effective to minimize or eliminate the safety hazards, referred to earlier, which are normally attendant to the use of power hand saws. It is further evident that while the safety switch has been disclosed in connection with its application to power hand saws, the safety switch may be used to advantage in many other power tools, such as table saws, drills, routers, and the like. In each of these applications, the safety switch is mounted on the tool in such a way that the safety switch actuator is depressed by the workpiece upon relative movement of the workpiece and tool into operative engagement. In the case of a table saw, for example, the safety switch actuator may be mounted on the saw table in advance of the saw blade in such a way that the actuator is depressed to energize the saw motor as the workpiece is advanced along the table into cutting engagement with the saw blade.

In some power tool operations, it may be desirable to inactivate the present safety switch, that is, to lock the safety switch in the condition in which it exists when the safety switch actuator is depressed by the workpiece. To this end, the illustrated power hand saw 10 is equipped with a latch 56 for locking the safety switch actuator 34 in its retracted position. Latch 56 comprises a generally L-shaped latch bar 58 which is pivotally mounted at 60 on the sole plate 16 of the saw for movement between a retracted position, wherein the latch releases the actuator for unrestricted movement between its normal and retracted positions, and its phantom line extended position of FIG. 3, wherein the free end of the latch projects through an opening in an upstanding flange 62 on the actuator to retain the latter in its retracted position.

It is now apparent that the invention herein described and illustrated is fully capable of attaining the several objects and advantages preliminarily set forth.

While a presently preferred embodiment of the invention has been disclosed for illustrative purposes, it is obvious that various modifications in the design, arrangement of parts, and instrumentalities of the invention are possible within the spirit and scope of the following claims.

I claim:
1. A power saw comprising:
a frame including a relatively smooth and flat work-engaging surface;
a rotary saw blade mounted on said frame in a transverse plane of said surface for turning on the central axis of the blade and having an effective cutting portion projecting beyond said surface;
an electrical motor on said frame for driving said blade in rotation on said axis in such manner that peripheral movement of said blade within said effective cutting portion thereof occurs in the direction of one edge of said surface;
said surface being adapted for sliding engagement with a workpiece to permit relative movement of said blade and said workpiece in such manner that the relative movement of the workpiece with respect to said blade occurs along said surface along a direction line parallel to the plane of said blade and through a position of cutting engagement with said effective cutting portion of said blade;
safety switch means on said frame including a resiliently yieldable actuating member extending along said surface parallel to said direction line and having one end located between said edge of said surface and said blade and its other end located adjacent a plane normal to said surface and containing said blade axis, whereby said actuating member is disposed to engage said workpiece prior to cutting engagement of the latter with said blade and to remain in contact with said workpiece until said blade and workpiece have moved out of cutting engagement, means pivotally mounting said one end of said actuating member on said frame on a pivot axis generally parallel to both said surface and said last mentioned normal plane for depression of said actuating member from a normal off position, wherein said actuating member projects beyond said surface, to an off position, wherein said actuating member is substantially flush with said surface, by said workpiece during relative movement of the workpiece through said position of cutting engagement with said blade, and an electrical switch operated between open and closed positions by said actuating member in response to movement of said actuating member between off and on positions; and
electrical circuit means connecting said electrical switch and motor in such manner that said motor is conditioned to be energized in response to movement of said actuating member to said on position and said motor is de-energized in response to movement of said actuating member to said off position.

2. A power saw according to claim 1 wherein:
said safety switch means include spring means for yieldably urging said actuating member to said off position.

3. A power saw according to claim 1 wherein:
said power saw is a portable hand saw adapted to be moved relative to said workpiece; and
said frame includes a sole plate which furnishes said work-engaging surface.

4. In a power hand saw including a frame having a sole plate with a work-engaging surface adapted for supporting contact with a workpiece, a circular saw blade rotatably mounted on said frame and projecting beyond said work-engaging surface for cutting engagement with the workpiece, a motor mounted on said frame and connected to said blade for driving the latter in rotation, and a manual switch on said frame for controlling said motor, said switch having an actuating member movable between a normal off position and an on position, the improvements comprising:
a second elongate switch actuating member disposed within an opening in said sole plate and extending parallel to the plane of said blade,
said second member having one end located in advance of said blade and its other end located rearwardly of the rotation axis of said blade,
means mounting said one end of said second member on said sole plate for pivotal movement of said second member between a normal off position wherein said member projects beyond said work-engaging surface and an on position wherein said member is substantially flush with said surface,
a safety switch mounted on said frame and means operatively connecting said work switch to said second switch actuating member for actuation of said work switch in response to movement of said second actuating member between said off and on positions thereof,
circuit means electrically connecting said switches to said motor in such manner that said motor is conditioned to be energized in response to simultaneous movement of said switch actuating members to said on positions thereof and said motor is de-energized in response to movement of either switch actuating member to said off position, and latch means for selectively latching said second switch actuating member in said on position thereof.

References Cited

UNITED STATES PATENTS

| | | | |
|---|---|---|---|
| 2,510,934 | 6/1950 | Schildknetch | 200—61.58 X |
| 2,787,679 | 4/1957 | Moretz | 200—61.58 |
| 3,172,121 | 3/1965 | Doyle et al. | 227—131 X |

OTHER REFERENCES

Reich (German application) 1,036,504, August 1958.

BERNARD A. GILHEANY, *Primary Examiner.*

H. A. LEWITTER, *Assistant Examiner.*